United States Patent
Iio et al.

(10) Patent No.: US 10,670,284 B2
(45) Date of Patent: Jun. 2, 2020

(54) HEAT EXCHANGING VENTILATION DEVICE

(71) Applicant: Panasonic Intellectual Property Management Co., Ltd., Osaka (JP)

(72) Inventors: Kouji Iio, Aichi (JP); Kenichi Ishiguro, Aichi (JP); Toshihiko Hashimoto, Aichi (JP); Yasuhiro Suzuki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 257 days.

(21) Appl. No.: 15/748,652

(22) PCT Filed: Sep. 16, 2016

(86) PCT No.: PCT/JP2016/004232
§ 371 (c)(1),
(2) Date: Jan. 29, 2018

(87) PCT Pub. No.: WO2017/051524
PCT Pub. Date: Mar. 30, 2017

(65) Prior Publication Data
US 2018/0224140 A1   Aug. 9, 2018

(30) Foreign Application Priority Data
Sep. 25, 2015  (JP) .................. 2015-188477

(51) Int. Cl.
*F24F 13/14* (2006.01)
*F24F 7/08* (2006.01)
(Continued)

(52) U.S. Cl.
CPC .............. *F24F 7/08* (2013.01); *F24F 12/006* (2013.01); *F24F 13/14* (2013.01);
(Continued)

(58) Field of Classification Search
CPC .... F24F 7/08; F24F 13/30; F24F 13/10; F24F 13/1413; F24F 13/22; F24F 12/001; F24F 12/006
(Continued)

(56) References Cited

U.S. PATENT DOCUMENTS

2011/0189937 A1* 8/2011 Hasegawa ............. F24F 12/006
454/239
2014/0260362 A1* 9/2014 Jung .................... F24F 12/006
62/80
(Continued)

FOREIGN PATENT DOCUMENTS

EP    1962030      8/2008
JP    55-095052    7/1980
(Continued)

OTHER PUBLICATIONS

International Search Report of PCT application No. PCT/JP2016/004232 dated Nov. 8, 2016.

*Primary Examiner* — Vivek K Shirsat
*Assistant Examiner* — Ko-Wei Lin
(74) *Attorney, Agent, or Firm* — McDermott Will and Emery LLP (57) ABSTRACT

A heat exchanging ventilation device includes supply air blower (8); exhaust air blower (9); a supply air blowing passage through which air to be delivered to indoor from outdoor by supply air blower (8) passes; a exhaust air blowing passage through which air to be delivered to the outdoor from the indoor by the exhaust air blower passes; heat exchange element (11) disposed at a position where both the supply air blowing passage and the exhaust air blowing passage pass and exchanging heat between air delivered by supply air blower (8) and air delivered by exhaust air blower (9); supply air damper (12) provided on supply air inlet (2) side of the supply air blowing passage;
(Continued)

exhaust air damper (13) provided on exhaust air outlet (3) side of the exhaust air blowing passage; and circulation damper (14) provided at boundary portion (25) which separates the supply air blowing passage and the exhaust air blowing passage from each other.

5 Claims, 5 Drawing Sheets

(51) Int. Cl.
  *F24F 12/00*  (2006.01)
  *F24F 13/20*  (2006.01)
  *F24F 13/30*  (2006.01)

(52) U.S. Cl.
  CPC .......... *F24F 13/1413* (2013.01); *F24F 13/20* (2013.01); *F24F 13/30* (2013.01); *Y02B 30/563* (2013.01)

(58) Field of Classification Search
  USPC .................. 454/239, 241, 249, 251, 252
  See application file for complete search history.

(56) References Cited

U.S. PATENT DOCUMENTS

| | | | |
|---|---|---|---|
| 2016/0115965 A1* | 4/2016 | Park | F04D 29/4226 |
| 2017/0051940 A1* | 2/2017 | Horie | F24F 1/0007 |

FOREIGN PATENT DOCUMENTS

| | | |
|---|---|---|
| JP | 60-155838 U | 10/1985 |
| JP | 3-152330 | 6/1991 |
| JP | 11-325535 | 11/1999 |
| JP | 2007-170713 | 7/2007 |

* cited by examiner

*PRIOR ART*

HEAT EXCHANGING VENTILATION DEVICE

CROSS-REFERENCE TO RELATED APPLICATIONS

This application is a U.S. national stage application of the PCT International Application No. PCT/JP2016/004232 filed on Sep. 16, 2016, which claims the benefit of foreign priority of Japanese patent application No. 2015-188477 filed on Sep. 25, 2015, the contents all of which are incorporated herein by reference.

TECHNICAL FIELD

The present invention relates to a heat exchanging ventilation device that exchanges heat between outdoor air and indoor air.

BACKGROUND ART

In the related art, as a heat exchanging ventilation device of this type, a heat exchanging ventilation device, which is installed in a building, introduces outdoor air from an outdoor air supply port, and supplies the outdoor air into a room via a built-in heat exchange element, is known (for example, see PTL 1).

Hereinafter, the heat exchanging ventilation device will be described with reference to FIG. 6.

Figure 6:
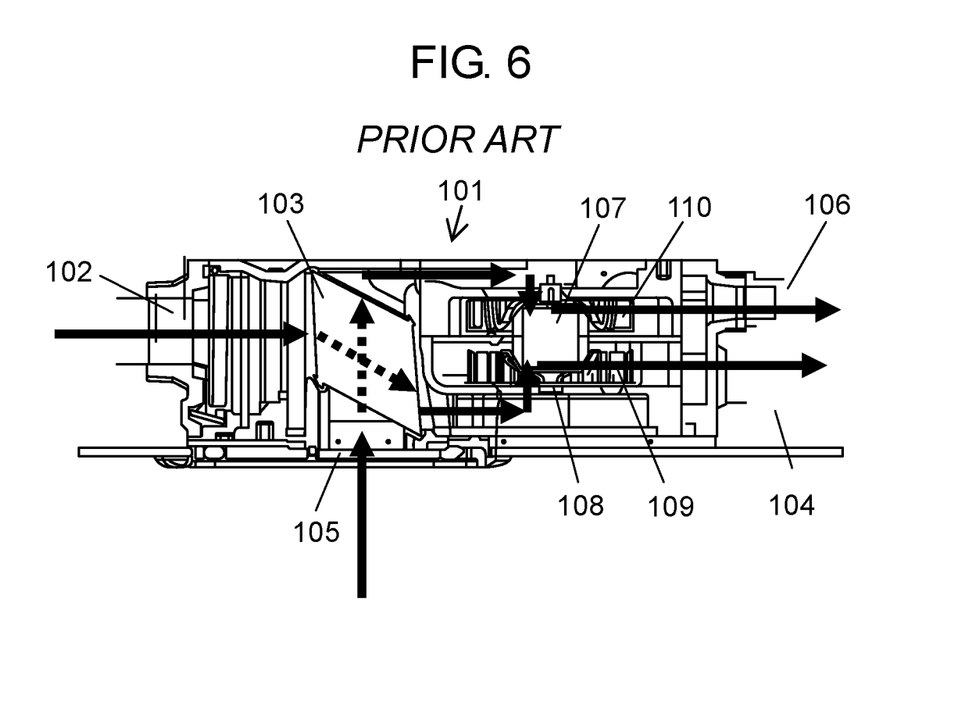
FIG. 6 is a view for explaining a heat exchanging ventilation device of the related art.

FIG. 6 is a view for explaining a heat exchanging ventilation device of the related art.

As illustrated in FIG. 6, ventilator main body 101 is installed in a roof rear space or a ceiling rear space in a building. Fresh air outside the room is introduced from outdoor air supply port 102, passes through heat exchange element 103 built in ventilator main body 101, and is supplied into the room via indoor air supply port 104. On the other hand, indoor dirty air is introduced from indoor air exhaust port 105, passes through heat exchange element 103, and is exhausted to the outside the room via outdoor air exhaust port 106. Outdoor fresh air introduced from outdoor air supply port 102 and indoor dirty air in the room introduced from indoor air exhaust port 105 are transferred by air supply fan 109 and air exhaust fan 110 connected to electric motor 107 through the same shaft 108 via heat exchange element 103.

CITATION LIST

Patent Literature

PTL 1: Japanese Patent Unexamined Publication No. 11-325535

SUMMARY OF THE INVENTION

In such a heat exchanging ventilation device of the related art, when a temperature of outdoor air decreases in winter, air exhausted from the room is cooled by a heat exchange element and there is a problem that moisture contained in the exhausted air is dew-condensed or frozen. In order to prevent dew-condensation or freezing from occurring in the heat exchange element, and intermittent operation of a heat exchanging ventilation device is performed, but there is a problem that the intermittent operation time is long in a cold district and a ventilation operation time is shortened.

The invention is made to solve the problems of the related art and an object thereof is to provide a heat exchanging ventilation device that can eliminate dew-condensation or freezing of a heat exchange element in a shorter time.

In order to obtain the object, a heat exchanging ventilation device of the invention includes a supply air blower; an exhaust air blower; a supply air blowing passage that is a passage through which air to be delivered to indoor from outdoor by the supply air blower passes; an exhaust air blowing passage that is a passage through which air to be delivered to the outdoor from the indoor by the exhaust air blower passes; a heat exchange element disposed at a position where both the supply air blowing passage and the exhaust air blowing passage pass and exchanging heat between air delivered by the supply air blower and air delivered by the exhaust air blower; a supply air damper provided on a supply air inlet side of the supply air blowing passage; an exhaust air damper provided on the exhaust air outlet side of the exhaust air blowing passage; air blowing passage and a circulation damper provided at a boundary portion which separates the supply air blowing passage and the exhaust air blowing passage from each other.

According to the heat exchanging ventilation device of the invention, in a state where the exhaust air damper and the supply air damper are closed and the circulation damper is opened, it is possible to form a circulation air blowing passage that is a passage through which air, which is delivered from the indoor to the supply air blower and delivered from the exhaust air blower to the indoor by the supply air blower, passes.

As a result, the heat exchanging ventilation device can eliminate dew-condensation or freezing of the heat exchange element in a shorter time.

DESCRIPTION OF EMBODIMENT

According to an aspect of the invention, there is provided a heat exchanging ventilation device including a supply air blower; an exhaust air blower; a supply air blowing passage that is a passage through which air to be delivered to indoor from outdoor by the supply air blower passes; an exhaust air blowing passage that is a passage through which air to be delivered to the outdoor from the indoor by the exhaust air blower passes; a heat exchange element disposed at a position where both the supply air blowing passage and the exhaust air blowing passage pass and exchanging heat between air delivered by the supply air blower and air delivered by the exhaust air blower; a supply air damper provided on a supply air inlet side of the supply air blowing passage; an exhaust air damper provided on the exhaust air outlet side of the exhaust air blowing passage; air blowing passage and a circulation damper provided at a boundary portion which separates the supply air blowing passage and the exhaust air blowing passage from each other.

According to the configuration, in a circulation operation, in which the supply air damper disposed on the supply air inlet side of the supply air blowing passage and the exhaust air damper disposed on the exhaust air outlet side of the exhaust air blowing passage are closed, the circulation damper disposed at the boundary portion of the supply air blowing passage and the exhaust air blowing passage is opened, indoor air sucked from an exhaust air blowing passage inlet is delivered to the supply air blowing passage, and is supplied into the indoor again, it is possible to form a circulation air blowing passage for guiding wind from the exhaust air blower to the supply air blowing passage by connecting the circulation damper disposed at the boundary portion of the supply air blowing passage and the exhaust air blowing passage to the exhaust air blower. As a result, the heat exchanging ventilation device can eliminate dew-condensation or freezing of the heat exchange element in a shorter time.

In addition, in a specific aspect of the heat exchanging ventilation device according to an aspect of the invention, in the exhaust air blowing passage, the exhaust air blower may be disposed on a downstream side from the heat exchange element.

According to the configuration, it is possible to guide the air delivered from the exhaust air blower to the circulation damper without causing a pressure loss by the heat exchange element. Therefore, the heat exchanging ventilation device has an effect that a circulation air amount can be increased.

In addition, in a specific aspect of the heat exchanging ventilation device according to an aspect of the invention, the circulation damper may be connected to a fan casing of the exhaust air blower.

According to the configuration, during the circulation operation, it is possible to smoothly guide a high pressure air delivered by the exhaust air blower to the circulation air blowing passage. That is, it is possible to deliver the high pressure air delivered by the exhaust air blower to the circulation air blowing passage while suppressing the pressure loss. Therefore, the heat exchanging ventilation device has an effect that a circulation air amount can be increased.

In addition, in a specific aspect of the heat exchanging ventilation device according to an aspect of the invention, the heat exchanging ventilation device may include a controller that controls opening and closing of the supply air damper, the exhaust air damper, and the circulation damper. The controller may open the circulation damper and close the supply air damper and the exhaust air damper in a case where a temperature of outdoor air is lowered to a predetermined temperature.

According to the configuration, when switching to the circulation operation again for delivering air into the indoor, in which the supply air damper disposed on the supply air inlet side of the supply air blowing passage and the exhaust air damper disposed on the exhaust air outlet side of the exhaust air blowing passage are closed, the circulation damper disposed the boundary portion of the supply air blowing passage and the exhaust air blowing passage is opened, and the indoor air sucked from the exhaust air blowing passage inlet is delivered to the supply air blowing passage, it is possible to disperse the pressure of the air blown out from the fan casing of the exhaust air blower by opening the circulation damper connected to an exhaust air fan casing and closing the exhaust air damper of the exhaust air blowing passage. Then, it is possible to suppress the pressure of the air applied to the exhaust air damper of the exhaust air blowing passage. Therefore, the heat exchanging ventilation device has an effect that a damper motor used for the exhaust air damper can be a low torque type with a small output and the cost can be reduced.

In addition, in a specific aspect of the heat exchanging ventilation device according to an aspect of the invention, a center of an opening portion of the circulation damper is disposed at a position lower than a rotation shaft of an impeller of the exhaust air blower.

According to the configuration, in a state where for example, the heat exchanging ventilation device is disposed in a roof rear space, it is possible to efficiently guide the air blown out from the impeller of the exhaust air blower downward in a vertical direction to the opening portion of the circulation damper and to increase an air blowing efficiency. Therefore, the heat exchanging ventilation device has the effect that the circulation air amount can be increased.

In addition, in a specific aspect of the heat exchanging ventilation device according to an aspect of the invention, the exhaust air damper may be connected to a fan casing of the exhaust air blower.

According to the configuration, in a state where the exhaust air damper is closed, the fan casing of the exhaust air blower can form a closed space. Then, the exhaust air blower can open the circulation damper during the circulation operation and can transmit power of the exhaust air blower to the air delivered to the opening portion of the circulation damper without leakage. Therefore, the heat exchanging ventilation device has the effect that the circulation air amount can be increased.

Hereinafter, embodiments of the invention will be described with reference to the drawings. Moreover, in the following embodiments, the same reference numerals are given to substantially same configurations and the description may be omitted. In addition, each of the following embodiments illustrates a specific example. Numerical values, shapes, materials, configuration elements, disposition positions and connecting modes of the configuration elements, steps, the order of the steps, or the like illustrated in the following embodiments is an example and is not intended to limit the gist of the invention. In addition, among the configuration elements in the following embodiments, configuration elements not described in an independent claim indicating the top level concept are described as arbitrary configuration elements.

For the heat exchanging ventilation device of the embodiment of the invention, an internal configuration, a supply air blowing passage, an exhaust air blowing passage, and a circulation air blowing passage will be described with reference to FIGS. 1 to 3.

Figure 1:
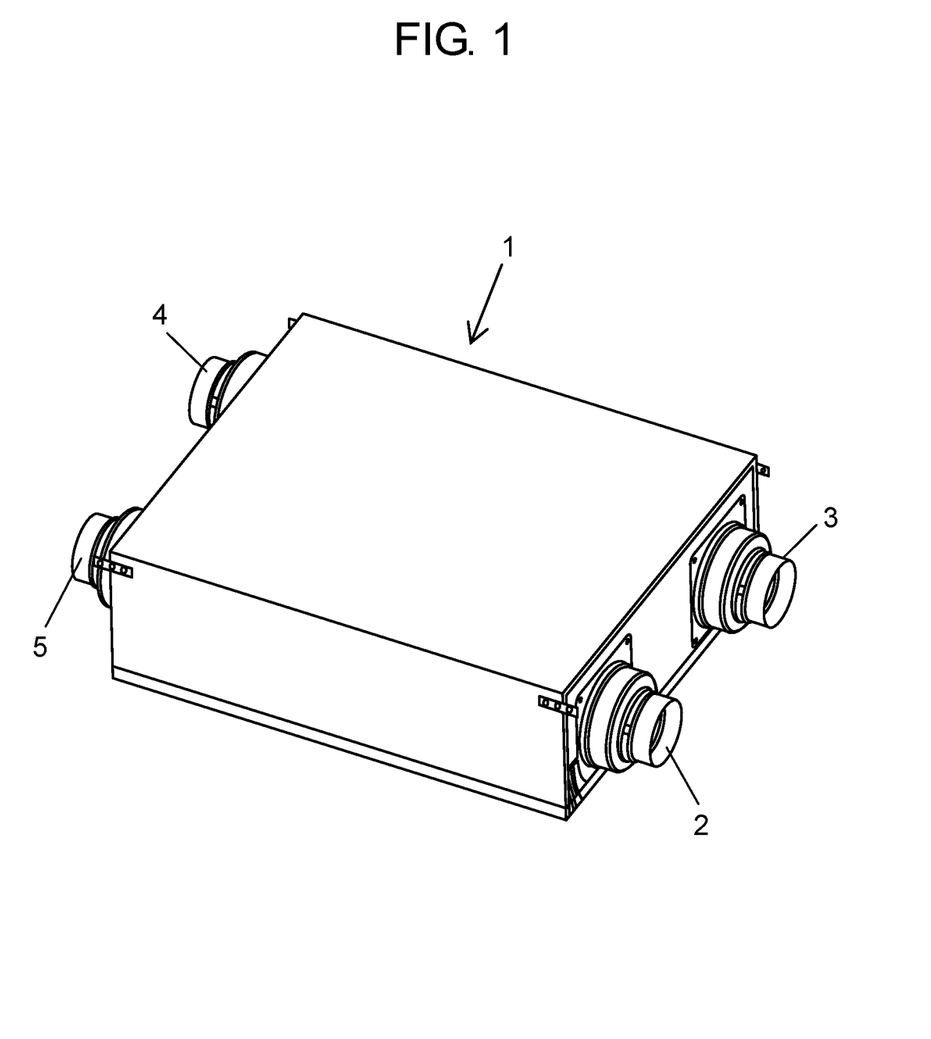
FIG. 1 is a perspective view illustrating a heat exchanging ventilation device according to an embodiment of the invention.

FIG. 1 is a perspective view illustrating a heat exchanging ventilation device according to Embodiment 1 of the invention. FIG. 2 is a view for explaining a supply air blowing passage and an exhaust air blowing passage of the heat exchanging ventilation device according to Embodiment 1 of the invention. FIG. 3 is a view for explaining a circulation air blowing passage of the heat exchanging ventilation device according to Embodiment 1 of the invention.

As illustrated in FIG. 1, heat exchanging ventilation device 1 includes supply air inlet 2 and exhaust air outlet 3 on one side surface of a box-shaped body. Heat exchanging ventilation device 1 includes air supply outlet 4 and air exhaust inlet 5 on the facing other side surface.

Figure 2:
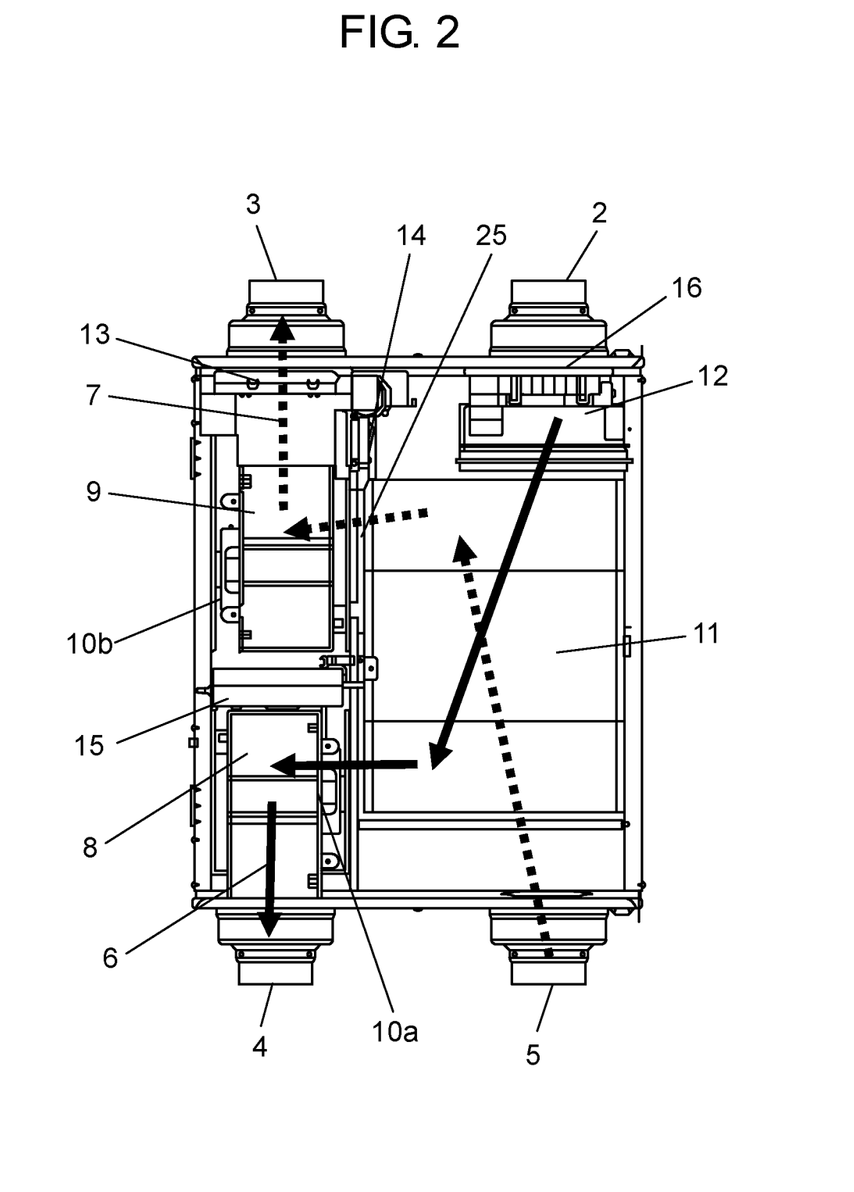
FIG. 2 is a view for explaining a supply air blowing passage and an exhaust air blowing passage of the heat exchanging ventilation device according to the embodiment of the invention.

As illustrated in FIG. 2, heat exchanging ventilation device 1 includes supply air blower 8, exhaust air blower 9, and heat exchange element 11. Heat exchanging ventilation device 1 includes controller 15 for controlling each of the number of revolutions of air supply motor 10*a* of supply air blower 8 and air exhaust motor 10*b* of exhaust air blower 9 in an inside thereof.

Heat exchanging ventilation device 1 includes supply air damper 12 disposed on supply air inlet 2 side of supply air blowing passage 6 (details will be described later), exhaust air damper 13 disposed on exhaust air outlet 3 side of exhaust air blowing passage 7 (details will be described later), and circulation damper 14 disposed at boundary portion 25 which separates supply air blowing passage 6 and exhaust air blowing passage 7. Controller 15 controls opening and closing of supply air damper 12, exhaust air damper 13, and circulation damper 14. Here, controller 15 may be disposed on the outside of heat exchanging ventilation device 1.

In a state of being illustrated in FIG. 2, supply air damper 12 and exhaust air damper 13 are opened and circulation damper 14 is closed.

Heat exchanging ventilation device 1 sucks fresh outdoor air (supply air) by supply air blower 8 from supply air inlet 2. The air passes through heat exchange element 11 on the inside of heat exchanging ventilation device 1 and is supplied from air supply outlet 4 onto the indoor. That is, heat exchanger device 1 includes supply air blowing passage 6 that is a passage through which the air delivered from the outdoor to the indoor by supply air blower 8 passes.

Here, in the embodiment, the outdoor means the outside of the room, but it is not limited thereto. For example, the outdoor may be a corridor.

On the other hand, heat exchanging ventilation device 1 sucks dirty indoor air (exhaust air) from air exhaust inlet 5 by exhaust air blower 9. The air passes through heat exchange element 11 and is exhausted from exhaust air outlet 3 to the outdoor.

That is, heat exchanger device 1 includes exhaust air blowing passage 7 that is a passage through which the air delivered from the indoor to the outdoor by exhaust air blower 9 passes. In exhaust air blowing passage 7, exhaust air blower 9 is disposed on a downstream side from heat exchange element 11.

In this case, heat exchange element 11 supplies an amount of heat possessed by the exhausted air to the supplied air or supplies an amount of heat possessed by the supplied air to the exhausted air. That is, heat exchange element 11 has a function of recovering heat of the air passing through heat exchange element 11.

Heat exchange element 11 is disposed at a position through which supply air blowing passage 6 and exhaust air blowing passage 7 passes. Heat exchange element 11 exchanges heat between the air delivered by supply air blower 8 and the air delivered by exhaust air blower 9.

Here, how the wind flows in supply air blowing passage 6 will be described. Hereinafter, unless otherwise specified, a case where a temperature of the indoor air is higher than a temperature of the outdoor air in the winter will be described.

First, warm indoor air is exhausted to the inside of heat exchanging ventilation device 1 by air exhaust inlet 5. The exhausted indoor air is sucked into exhaust air blower 9 through heat exchange element 11.

Exhaust air blower 9 delivers the air toward exhaust air outlet 3. In this case, exhaust air damper 13 is opened and the air is exhausted from exhaust air outlet 3 to the outdoor. In this case, the passage of the air, that is, supply air blowing passage 6 is indicated by solid arrows.

Next, how the wind flows in exhaust air blowing passage 7 will be described.

In a state where supply air damper 12 is opened, when supply air blower 8 is operated, cooled outdoor air is sucked into supply air blower 8 from supply air inlet 2 through heat exchange element 11 and the air is supplied from air supply outlet 4 to the indoor by supply air blower 8. In this case, the passage of the air, that is, exhaust air blowing passage 7 is indicated by broken arrows.

In supply air blowing passage 6, temperature detector 16 is disposed on the supply air inlet side of heat exchange element 11. Temperature detector 16 is, for example, a thermometer or a thermocouple which outputs an electric signal such as a voltage corresponding to the temperature.

Supply air inlet 2, exhaust air outlet 3, air supply outlet 4, and air exhaust inlet 5 are respectively shaped so that ducts (not illustrated) can be connected. For example, the duct connected to supply air inlet 2 and exhaust air outlet 3 is routed to an outer wall surface of a building and communicates with the outdoor air. The duct connected to air supply outlet 4 and air exhaust inlet 5 is connected to a ceiling surface or a wall surface in the indoor to communicate with the indoor air.

Controller 15 controls each of the number of revolutions of air supply motor 10*a* of supply air blower 8 and air exhaust motor 10*b* of exhaust air blower 9, and constantly maintains a supply air amount and an exhaust air amount. Moreover, supply air blower 8 and exhaust air blower 9 may respectively include air supply motor 10*a* and air exhaust motor 10*b*. For example, one motor is connected to impeller 21*a* (not illustrated) of supply air blower 8 and impeller 21*b* of exhaust air blower 9 (see FIG. 4 and details will be described later), and may be configured so as to rotate each of the impellers.

Figure 4:
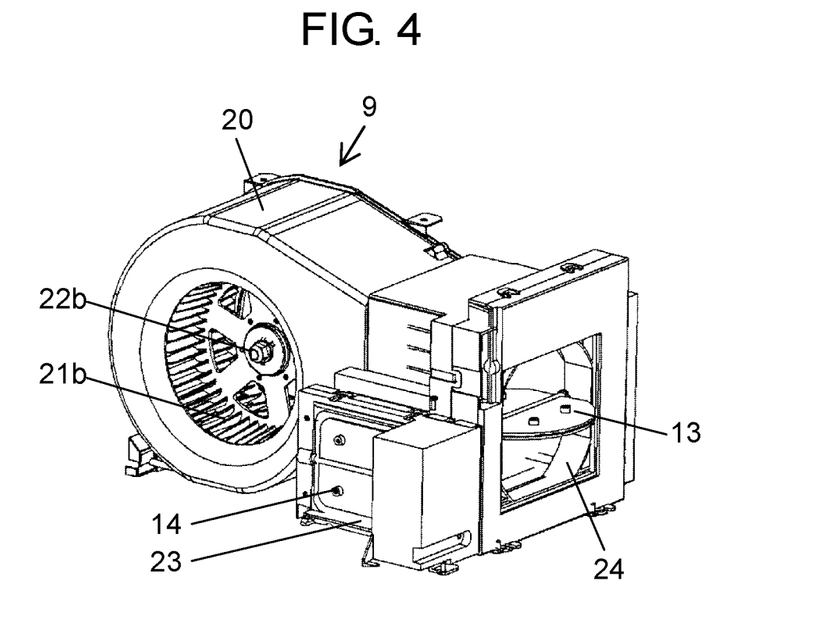
FIG. 4 is a view illustrating a state during a heat exchange ventilating operation of an exhaust air blower according to the embodiment of the invention.

FIG. 4 is a view illustrating a state during a heat exchange ventilating operation of the exhaust air blower according to Embodiment 1 of the invention. Specifically, FIG. 4 is a view illustrating a state of exhaust air blower 9, exhaust air damper 13, and circulation damper 14 during the heat exchange ventilating operation.

As illustrated in FIG. 4, exhaust air blower 9 includes fan casing 20, impeller 21*b*, and air exhaust motor 10*b* (see FIG. 2). Rotation shaft 22*b* of air exhaust motor 10*b* is connected to impeller 21*b*. A center of opening portion 23 of circulation damper 14 is disposed at a position (downward in the vertical direction in a state of installation of heat exchanging ventilation device 1) lower than rotation shaft 22*b* of impeller 21*b* of exhaust air blower 9. Circulation damper 14 including opening portion 23 is connected to fan casing 20 of exhaust air blower 9. Exhaust air damper 13 including opening portion 24 is connected to fan casing 20 of exhaust air blower 9.

Here, an operation of heat exchanging ventilation device 1 during the heat exchange ventilating operation will be described.

In FIG. 2, when heat exchanging ventilation device 1 is actuated, controller 15 controls each of the number of revolutions of air supply motor 10*a* and air exhaust motor 10*b* so that the supply air amount of supply air blower 8 and the exhaust air amount of exhaust air blower 9 are equal to each other.

In this case, supply air damper 12 and exhaust air damper 13 are opened and circulation damper 14 is closed and thereby supply air blowing passage 6 and exhaust air blowing passage 7 are separated.

Here, when the temperature of the outdoor air is decreased during the heat exchange ventilating operation, the air, which is exhausted from the indoor and flows through exhaust air blowing passage 7, causes heat exchange element 11 to generate dew-condensation. This is because warm indoor air (exhausted air) flowing through exhaust air blowing passage 7 exchanges heat with cooled outdoor air (supplied air) within heat exchange element 11 and thereby the temperature decreases below a dew point. That is, this is because the exhausted air holds moisture content greater than or equal to a saturated water vapor amount of the temperature after the heat exchange.

The moisture generated by the dew-condensation is frozen when the temperature of the air exhausted after the heat exchange is lower than 0° C. The frozen moisture causes clogging of heat exchange element 11 and reduces a ventilation function of heat exchanging ventilation device 1.

When the heat exchange ventilating operation is continued as it is, freezing of the moisture dew-condensed in heat exchange element 11 further proceeds and a large amount of the moisture freezes. The frozen moisture is melted when the temperature of the outdoor air rises and overflows from heat exchanging ventilation device 1. The overflowing moisture adversely affects heat exchanging ventilation device 1 such as insufficient insulation caused by water leakage.

In order to avoid such a phenomenon, heat exchanging ventilation device 1 can perform the circulation operation to be described below.

In during the heat exchange ventilating operation illustrated in FIG. 2, controller 15 monitors the temperature of the outdoor air by temperature detector 16 provided on the supply air inlet side of heat exchange element 11. As illustrated in FIG. 3, in a case where the temperature of the outdoor air is lower than a predetermined temperature, controller 15 opens circulation damper 14 and closes supply air damper 12 and exhaust air damper 13. In this case, heat exchanging ventilation device 1 forms circulation air blowing passage 17 and performs the circulation operation.

Next, how the wind flows in circulation air blowing passage 17 during the circulation operation will be described with reference to FIG. 3.

First, the warm indoor air is exhausted by air exhaust inlet 5. The exhausted indoor air is sucked into exhaust air blower 9 through heat exchange element 11. Exhaust air blower 9 delivers the air toward exhaust air outlet 3. In this case, exhaust air damper 13 is closed and the air is not exhausted from exhaust air outlet 3. Instead, circulation damper 14 is opened and thereby the air passes through heat exchange element 11 and is flown to supply air blower 8 side.

Figure 5:
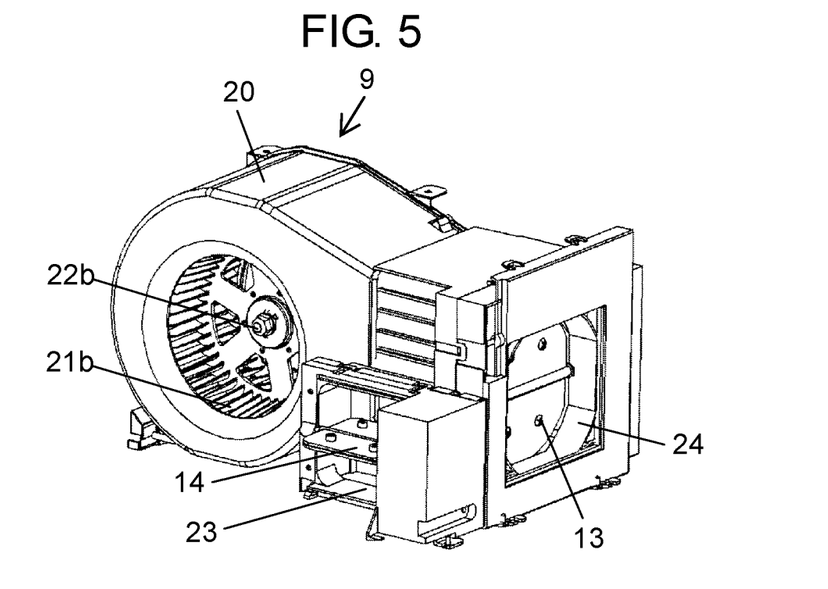
FIG. 5 is a view illustrating a state during a circulation operation of the exhaust air blower according to the embodiment of the invention.

Here, in details, FIG. 5 is a view illustrating a state of exhaust air blower 9, exhaust air damper 13, and circulation damper 14 during the circulation operation.

Here, FIG. 5 illustrates the state of exhaust air blower 9, exhaust air damper 13, and circulation damper 14 during the circulation operation. That is, FIG. 5 is a view illustrating a state during the circulation operation of the exhaust air blower according to Embodiment 1 of the invention.

In this case, exhaust air blower 9 performs a task of discharging the indoor air and also performs a task of delivering the indoor air to supply air blowing passage 6 through circulation damper 14. That is, exhaust air blower 9 performs a task of the circulation operation.

Figure 3:
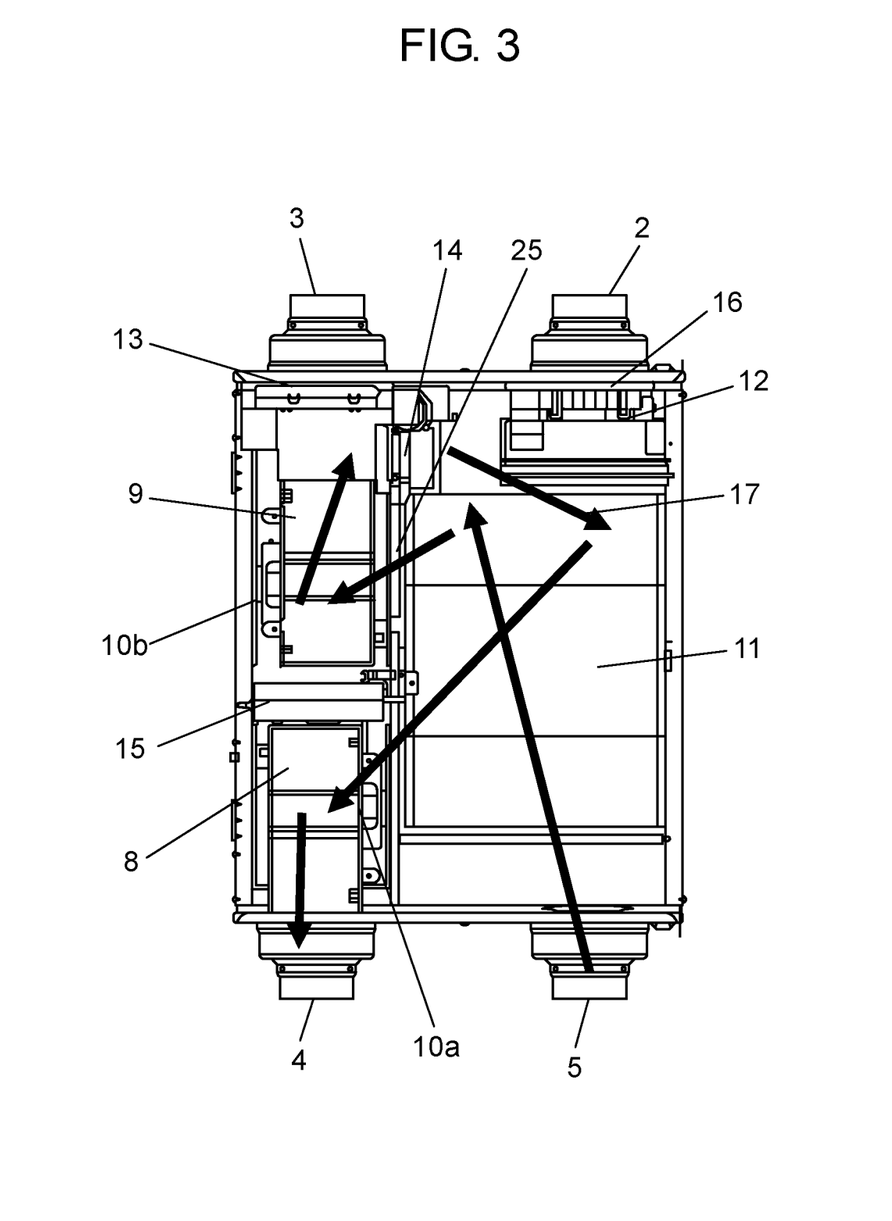
FIG. 3 is a view for explaining a circulation air blowing passage of the heat exchanging ventilation device according to the embodiment of the invention.

Next, as illustrated in FIG. 3, the air flown to supply air blower 8 side passes through heat exchange element 11 and is sucked into supply air blower 8. Supply air blower 8 circulates the air to the indoor again by air supply outlet 4. In this case, the passage of the air, that is, circulation air blowing passage 17 is indicated by solid arrows.

In this case, since supply air damper 12 is closed, supply air blower 8 does not cause the outdoor air to be sucked from supply air inlet 2. That is, supply air blower 8 sucks only the indoor air passing through circulation damper 14 and passing through circulation air blowing passage 17.

As described above, the warm indoor air flows to both supply air blowing passage 6 side and exhaust air blowing passage 7 side of heat exchange element 11 during the circulation operation. Therefore, there is an effect of warming heat exchange element 11 cooled by the cooled outdoor air, solving the frozen moisture in heat exchange element 11, or preventing freezing of the moisture dew-condensed in heat exchange element 11.

Controller 15 performs the circulation operation for a predetermined period of time by detecting that the temperature of the outdoor air is less than or equal to a predetermined temperature by temperature detector 16. Therefore, dew-condensation and freezing of heat exchange element 11 are prevented.

After a predetermined period of time, supply air damper 12 and exhaust air damper 13 are opened and circulation damper 14 is closed again and thereby supply air blowing passage 6 and exhaust air blowing passage 7 are formed and the heat exchange ventilating operation is performed.

In a case where the temperature of the outdoor air is lower than or equal to a predetermined temperature, controller 15 repeatedly continues an operation of switching the heat exchange ventilating operation and the circulation operation at a predetermined period of time. When the temperature of the outdoor air increases to a temperature greater than or equal to a predetermined temperature, only the heat exchange ventilating operation is continued again.

In addition, circulation damper 14 is disposed on the downstream side of exhaust air blower 9. Therefore, during the circulation operation, exhaust air blower 9 and supply air blower 8 are simultaneously operated and it is possible to deliver the indoor air by power of two blowers. Therefore, heat exchanging ventilation device 1 can increase the circulation air amount.

In the embodiment, circulation damper 14 including opening portion 23 is connected to fan casing 20 of exhaust air blower 9. Therefore, during the circulation operation, heat exchanging ventilation device 1 can smoothly guide the high pressure air to circulation air blowing passage 17. As described above, heat exchanging ventilation device 1 can deliver the high pressure air delivered by exhaust air blower 9 to circulation air blowing passage 6 while suppressing the pressure loss. Therefore, heat exchanging ventilation device 1 can increase the circulation air amount.

In addition, heat exchanging ventilation device 1 can prevent dew-condensation of heat exchange element 11 and can solve the frozen moisture by performing the circulation operation. In this case, heat exchanging ventilation device 1 according to the embodiment can shorten the time to eliminate dew-condensation or freezing compared to a case where the heat exchange ventilating operation is simply stopped without performing the circulation operation. As a result, heat exchanging ventilation device 1 can lengthen the time of the heat exchange ventilating operation. Therefore, heat exchanging ventilation device 1 can continue ventilation for a longer period of time.

In addition, in a case where the temperature of the supply air inlet side of supply air blowing passage 6 is lowered to a predetermined temperature, controller 15 may open circulation damper 14 and may close supply air damper 12 and exhaust air damper 13. In other words, in a case where the temperature of the supply air inlet side of supply air blowing passage 6 is lowered to a predetermined temperature, controller 15 may close supply air damper 12 and exhaust air damper 13 simultaneously with opening of circulation damper 14, or after opening of circulation damper 14.

Here, in order for temperature detector 16 to detect the temperature less than or equal to a predetermined temperature and to perform the circulation operation, controller 15 opens circulation damper 14 and closes supply air damper 12 and exhaust air damper 13, thereby forming circulation air blowing passage 17.

In this case, exhaust air damper 13 performs an operation of closing while receiving the pressure of the air delivered from exhaust air blower 9. Therefore, the motor driving exhaust air damper 13 requires a large torque.

Therefore, it is possible to disperse the pressure of the air delivered from exhaust air blower 9 and to suppress the pressure of the air applied to exhaust air damper 13 by opening circulation damper 14 connected to fan casing 20 and closing supply air damper 12 and exhaust air damper 13.

Therefore, in heat exchanging ventilation device 1, the damper motor used for exhaust air damper 13 can be a low torque type with a small output and the cost can be reduced.

Moreover, it is preferable that the center of opening portion 23 of circulation damper 14 is disposed at a position lower than rotation shaft 22b of impeller 21b of exhaust air blower 9.

According to the configuration, heat exchanging ventilation device 1 can efficiently guide the wind blown out downward from fan casing 20 to opening portion 23 of circulation damper 14. Therefore, heat exchanging ventilation device 1 can increase the circulation air amount by increasing the air blowing efficiency.

In addition, it is preferable that exhaust air damper 13 including opening portion 24 is connected to fan casing 20 of exhaust air blower 9. In this case, heat exchanging ventilation device 1 can form the closed space from fan casing 20 to exhaust air damper 13 when exhaust air damper 13 is closed. Such a closed space is also configured by circulation damper 14 connected to exhaust air blower 9. During the circulation operation in which exhaust air damper 13 is closed and circulation damper 14 is opened, the high pressure air delivered by exhaust air blower 9 flows to opening portion 23 of circulation damper 14. The air is smoothly delivered to supply air blowing passage 6 without being leaked to the outside of fan casing 20. As described above, heat exchanging ventilation device 1 can deliver the high pressure air delivered by exhaust air blower 9 to supply air blowing passage 6 while suppressing the pressure loss. Therefore, heat exchanging ventilation device 1 can increase the circulation air amount.

In addition, it is preferable that the shape of opening portion 23 of circulation damper 14 a quadrangle with rounded corners. According to the configuration, heat exchanging ventilation device 1 can reduce the resistance due to the vortex generated when the wind flows and can increase the air blowing efficiency. At the same time, heat exchanging ventilation device 1 can reduce noise due to wind noise.

In addition, in the example, controller 15 is disposed on the inside of heat exchanging ventilation device 1, but controller 15 may not be necessarily disposed on the inside of heat exchanging ventilation device 1. For example, controller 15 is not disposed on the inside of heat exchanging ventilation device 1 and the temperature of the outdoor air is monitored by controller 15 disposed at a remote place. Any one of supply air blower 8, exhaust air blower 9, supply air damper 12, exhaust air damper 13, and circulation damper 14 may be controlled by controller 15 located at a remote place.

In addition, temperature detector 16 is disposed on the outside of heat exchanging ventilation device 1 and may measure the temperature of the outdoor air.

INDUSTRIAL APPLICABILITY

The heat exchanging ventilation device according to the invention is also useful as a use of a duct type ventilation device, a duct type air conditioning device, or the like which performs heat exchange between the outdoor air and the indoor air.

REFERENCE MARKS IN THE DRAWINGS

1 HEAT EXCHANGING VENTILATION DEVICE
2 SUPPLY AIR INLET
3 EXHAUST AIR OUTLET
4 AIR SUPPLY OUTLET
5 AIR EXHAUST INLET
6 SUPPLY AIR BLOWING PASSAGE
7 EXHAUST AIR BLOWING PASSAGE
8 SUPPLY AIR BLOWER
9 EXHAUST AIR BLOWER
10a AIR SUPPLY MOTOR
10b AIR EXHAUST MOTOR
11 HEAT EXCHANGE ELEMENT
12 SUPPLY AIR DAMPER
13 EXHAUST AIR DAMPER
14 CIRCULATION DAMPER
15 CONTROLLER
16 TEMPERATURE DETECTOR
17 CIRCULATION AIR BLOWING PASSAGE
20 FAN CASING
21b IMPELLER
22b ROTATION SHAFT
23 OPENING PORTION
24 OPENING PORTION
25 BOUNDARY PORTION

The invention claimed is:
1. A heat exchanging ventilation device comprising:
a supply air blower;
an exhaust air blower;
a supply air blowing passage that is a passage through which air to be delivered to indoor from outdoor by the supply air blower passes;
an exhaust air blowing passage that is a passage through which air to be delivered to the outdoor from the indoor by the exhaust air blower passes;
a heat exchange element disposed at a position where both the supply air blowing passage and the exhaust air blowing passage pass and exchanging heat between air delivered by the supply air blower and air delivered by the exhaust air blower;
a supply air damper provided on a supply air inlet side of the supply air blowing passage;
an exhaust air damper provided on an exhaust air outlet side of the exhaust air blowing passage; and a partition wall which separates the supply air blowing passage and the exhaust air blowing passage from each other, wherein the partition wall includes a circulation damper housing having a circulation damper housing opening which communicates the supply air blowing passage and the exhaust air blowing passage, wherein the circulation damper housing includes a circulation damper which opens and closes the circulation damper housing opening, and wherein a center of the circulation damper housing opening is disposed at a position lower than a rotation shaft of an impeller of the exhaust air blower.

2. The heat exchanging ventilation device according to claim 1, wherein in the exhaust air blowing passage, the exhaust air blower is disposed on a downstream side from the heat exchange element.

3. The heat exchanging ventilation device according to claim 1, wherein the circulation damper housing is connected to a fan casing of the exhaust air blower.

4. The heat exchanging ventilation device according to claim 1, further comprising:

a controller that controls opening and closing of the supply air damper, the exhaust air damper, and the circulation damper, wherein the controller opens the circulation damper and closes the supply air damper and the exhaust air damper in a case where a temperature of outdoor air is lowered to a predetermined temperature.

5. The heat exchanging ventilation device according to claim 1, further comprising:

an exhaust damper housing having an exhaust air outlet opening which communicate the exhaust air blowing passage and the outdoor, wherein the exhaust air damper opens and closes the exhaust air outlet opening, and wherein the exhaust damper housing is connected to a fan casing of the exhaust air blower.

* * * * *